United States Patent [19]
Morton et al.

[11] Patent Number: 5,295,212
[45] Date of Patent: Mar. 15, 1994

[54] SYSTEM FOR TRANSMITTING SIGNALS BETWEEN OPTICAL TRANSCEIVERS

[75] Inventors: Randall E. Morton, Redmond; William R. Little; David L. Brodeur, both of Seattle, all of Wash.

[73] Assignee: Eldec Corporation, Lynnwood, Wash.

[21] Appl. No.: 969,878

[22] Filed: Oct. 29, 1992

[51] Int. Cl.$^5$ .............................................. G02B 6/24
[52] U.S. Cl. ...................................... 385/57; 244/131; 340/870.28; 359/173; 385/24; 385/25; 385/147
[58] Field of Search ...................... 244/131; 385/24, 25, 385/53, 57, 75, 100, 115, 147; 359/154, 173; 439/38'40; 340/870.28, 870.29

[56] References Cited

U.S. PATENT DOCUMENTS

| | | | |
|---|---|---|---|
| 3,943,357 | 3/1976 | Culver | 250/199 |
| 4,399,563 | 8/1983 | Greenberg | 455/607 |
| 4,491,792 | 1/1985 | Bullock et al. | 385/57 X |
| 4,641,915 | 2/1987 | Asakawa et al. | 350/96.18 |
| 4,669,791 | 6/1987 | Savill | 439/38 X |
| 4,690,495 | 9/1987 | Giannini | 385/57 |
| 4,844,582 | 7/1989 | Giannini | 350/96.21 |
| 4,856,872 | 8/1989 | Spitznas et al. | 350/255 |
| 4,903,340 | 2/1990 | Sorensen | 385/57 X |
| 4,985,922 | 1/1991 | Kolbert | 439/38 X |
| 5,007,697 | 4/1991 | Chadha | 350/96.15 |

FOREIGN PATENT DOCUMENTS

| | | | |
|---|---|---|---|
| 2916763 | 10/1979 | Fed. Rep. of Germany | 385/57 |
| 3319466 | 3/1984 | Fed. Rep. of Germany | 385/57 |

*Primary Examiner*—John D. Lee
*Attorney, Agent, or Firm*—Christensen, O'Connor, Johnson & Kindness

[57] ABSTRACT

A communications system for transmitting optical signals between an optical transceiver (20) disposed on an aircraft and a ground-based computer system. The communications system includes a fiber optic cable (30) having one end coupled to the ground-based computer system and another end coupled to a magnetic attachment head (40). The magnetic attachment head secures the fiber optic cable to the aircraft and aligns the fiber optic cable with the optical transceiver.

19 Claims, 7 Drawing Sheets

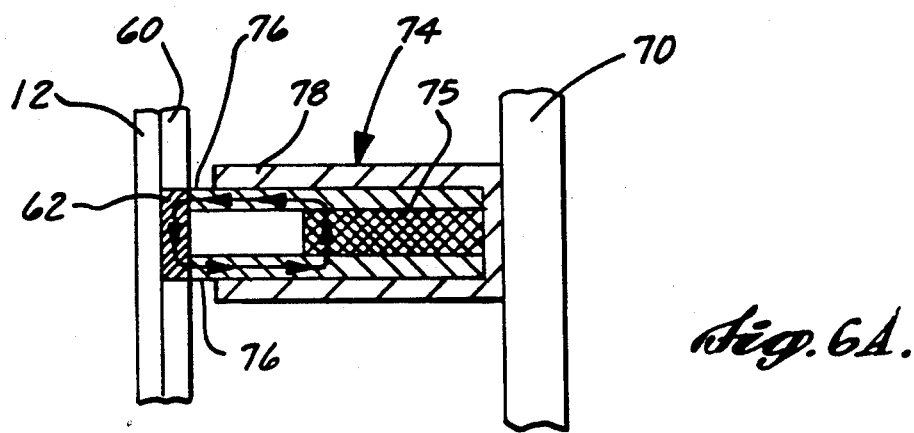
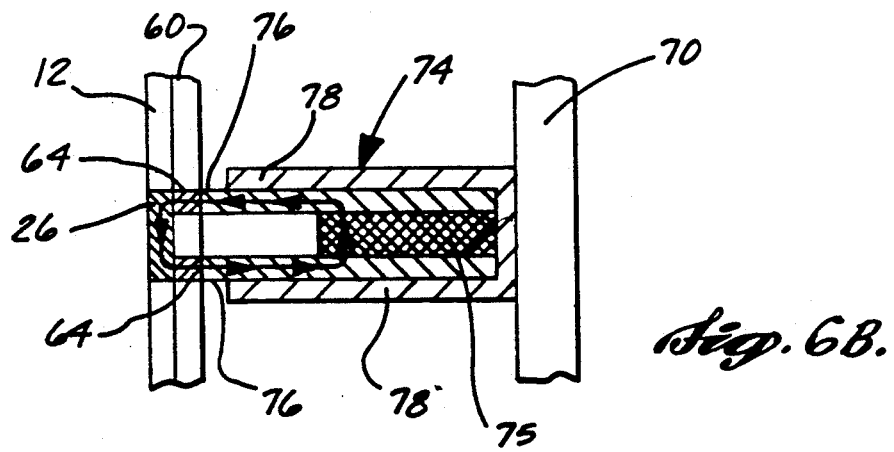

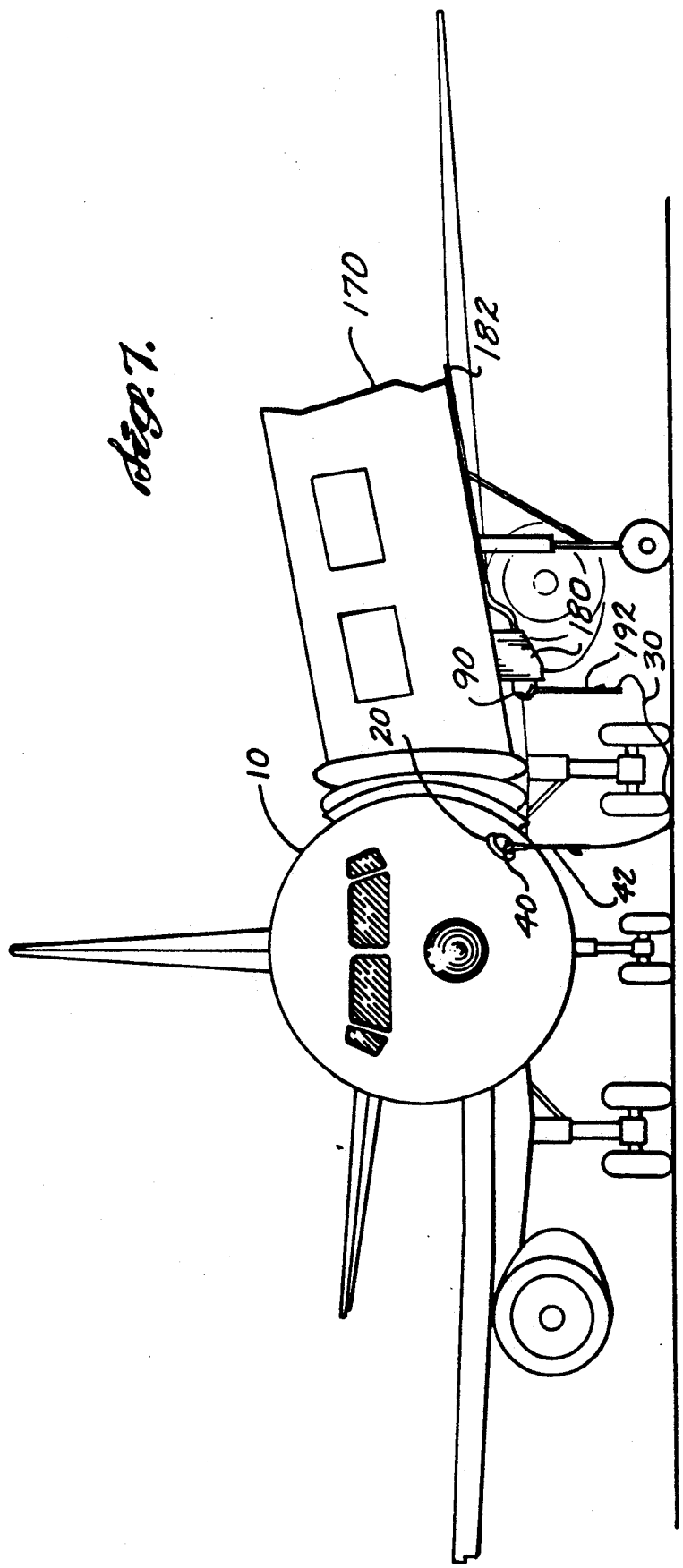

SYSTEM FOR TRANSMITTING SIGNALS BETWEEN OPTICAL TRANSCEIVERS

FIELD OF THE INVENTION

The present invention relates to communication systems in general and, in particular, to communication systems that transmit data between an aircraft computer system and a ground-based computer system.

BACKGROUND OF THE INVENTION

In the last twenty years, computers have played an ever-increasing role in the airline industry. For example, computers are used onboard an aircraft for such tasks as aiding navigation, scheduling maintenance, and monitoring the operation of equipment, as well as for controlling the position of the flight control surfaces to fly the aircraft. On the ground, computers are used to ticket passengers, keep track of their luggage, maintain records of seat availability, and schedule departure changes. Despite recent advances in computer network system technology, the ability to exchange data between the aircraft computer system and the ground-based computer system used by an airline has remained limited. What information transfer does take place is typically accomplished by hand carrying computer discs between the two computer systems. Due to the desirability of transmitting information between an aircraft computer system and a ground-based computer, there has been a considerable research effort within the aircraft industry to develop an aircraft to ground-based computer communications link.

One new communications system for transmitting information between an aircraft computer system and a ground-based computer system is disclosed in commonly assigned U.S. patent application Ser. No. 07/943,328, filed Sept. 10, 1992, the specification of which is herein incorporated by reference. This system discloses a free-space optical communications link that transmits data between an aircraft computer system and a ground-based computer system using an infrared light beam. An optical transceiver disposed below a passenger door of the aircraft transmits a modulated infrared beam to a corresponding optical transceiver that is located on a passenger loading bridge. Both the transceiver on the passenger bridge and on the aircraft include a separate optical transmitter and receiver for transmitting and receiving infrared optical signals that correspond to the data transmitted between the two computer systems. When the aircraft is docked at the passenger loading bridge, the optical transceiver on the aircraft is aligned with the corresponding optical transceiver such that information transfer can take place by transmitting the infrared beams through the air space that exists between the two transceivers.

While the above-referenced system works well to transmit data between the aircraft computer system and the ground-based computer system, there are some situations in which it is either impossible or impractical to provide an optical transceiver in close proximity with the optical transceiver disposed on the aircraft so that information can be transmitted between the two computer systems. For example, in certain airports, passengers do not board aircraft in the type of loading bridge upon which it is convenient to mount the optical transceiver, as described in the referenced patent application. Some airports use movable stairs disposed on motorized vehicles to board the passengers while others rely on stairs that are built into the aircraft to board the passengers. In either case it would be difficult to mount an optical transceiver in close proximity with the optical transceiver disposed on the aircraft so that data communication can take place. In the case where movable stairs are used, an optical transceiver would have to be mounted on the stairs and some type of cable would need to run to a manhole or some other location to carry the data to the ground-based computer. However, because such vehicles are movable, the possibility exists that the vehicle with the stairs attached would drive off and break the cable or that the vehicle would not be at its proper location when the aircraft docked, thereby delaying the linking of the two computer systems. In the case where passengers board the aircraft using a built-in stairway, an adjustable scaffold would have to be provided to align the optical transducers. Such a scaffold would most likely be cumbersome, interfere with the ground crew's access to the aircraft and get in the way when not in use.

Another situation where it is not practical to provide an optical transceiver that can be placed in close proximity with the optical transceiver disposed on the exterior of the aircraft is when the aircraft is parked at some remote location in an airport such as a holding area or in a repair hangar. Such a location would also have to be equipped with a scaffold that could align the optical transceiver with the transceiver on the aircraft. Again, such a scaffold would most likely be cumbersome and would interfere with the ground crew's access to the aircraft.

Therefore, a need exists for a communications system that can transmit information between an aircraft computer system and a ground-based computer system in those situations where it is either not feasible or not practical to provide an adjustable mechanism for aligning an optical transceiver to transmit and receive infrared signals from the optical transceiver disposed on the exterior of the aircraft. The system should be rugged and able to work in extreme environments. Most importantly, the system should be compatible with the existing aircraft infrared communications system referenced above.

SUMMARY OF THE INVENTION

The present invention is a system for transmitting optical signals between an optical transceiver that is disposed on the exterior of an aircraft and a ground-based computer system. The system includes a fiber optic cable that is coupled at one end to the ground-based computer system and is coupled at another end to the aircraft. Optical signals produced by the optical transceiver disposed on the aircraft are carried by the fiber optic cable between an aircraft computer system and the ground-based computer system.

A magnetic attachment head secures the fiber optic cable to the aircraft and aligns the fiber optic cable with the optical transceiver. The magnetic attachment head includes a plurality of magnets that are to be aligned with corresponding magnetic target elements disposed on the exterior of the aircraft to secure the attachment head onto the side of the aircraft. When the plurality of magnets are aligned with the corresponding magnetic target elements, the fiber optic cable is aligned with the optical transceiver disposed on the aircraft. The magnetic attachment head further includes a mechanism for rotating the magnets such that the magnets are aligned with either a plurality of pole piece extenders or a plurality of magnetic keepers. The pole piece extenders allow the magnetic fields produced by the plurality of magnets to extend outwardly from the attachment head unit in order to secure the attachment head unit to the exterior of the aircraft. The magnetic keepers when aligned with the plurality of magnets contain the magnetic fields within the magnetic attachment head in order to release the magnetic attachment head from the aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 6A is a view showing how a magnet assembly included within the magnetic attachment head is aligned with a magnetic keeper to prevent the magnetic field produced by the magnet from extending outwardly from a front face of the magnetic attachment head;

FIG. 6B is a view showing how a magnet assembly included within the magnetic attachment head is aligned with a pair of pole piece extenders to extend the magnetic field produced by the magnet outwardly from a front face of the magnetic attachment head;

FIG. 7 shows an alternate embodiment of the present invention in which the fiber optic cable includes a pair of magnetic attachment heads.

DETAILED DESCRIPTION OF THE PREFERRED EMBODIMENT

Figure 1:
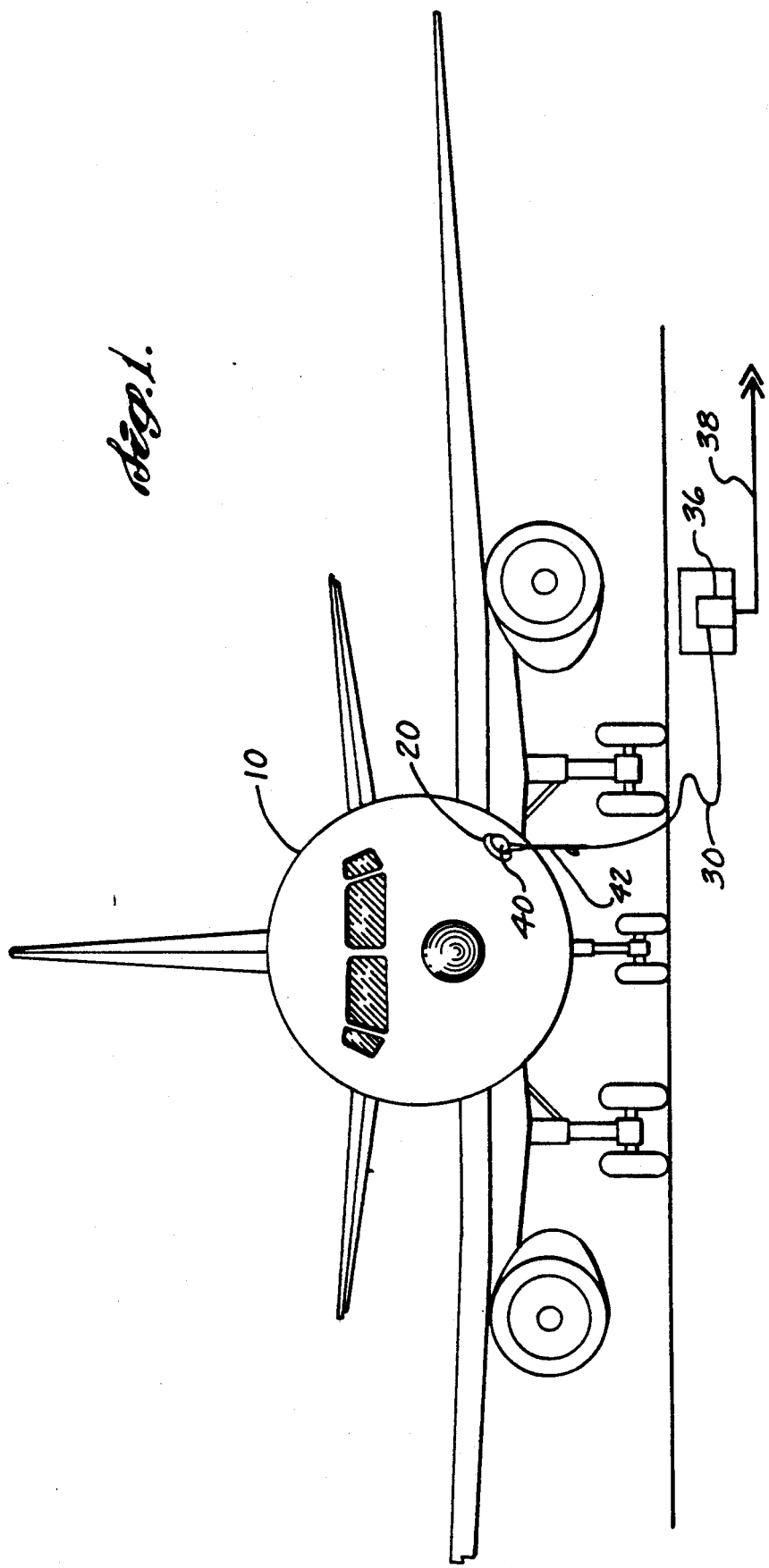
FIG. 1 is an environmental view showing a system for transmitting optical signals between an aircraft computer system and a ground-based computer system according to the present invention.

FIG. 1 shows a communications system for transmitting optical signals between an aircraft computer system and a ground-based computer system according to the present invention. An aircraft 10 includes an optical transceiver 20 that is coupled to the aircraft computer system (not shown). The optical transceiver transmits optical signals to and receives optical signals from a corresponding optical transceiver that is coupled to the ground-based computer system. The details of the optical transceiver 20 are fully disclosed in the copending U.S. patent application Ser. No. 07/943,328. Complementing the communications system disclosed in the '328 application, the present invention is to be used when it is either not possible or practical to support on a loading bridge or scaffold a corresponding optical transceiver that is coupled to the ground-based computer system near the optical transceiver 20. For example, the aircraft 10 may be located in a repair hangar or at some remote location at an airport where such a scaffold would be cumbersome. Without a corresponding optical transceiver in close proximity with the optical transceiver 20, data transfer could not take place.

The present invention includes a fiber optic cable 30 that extends between a junction box 36 and a magnetic attachment head 40. The junction box 36 includes an optical transceiver that transmits and receives optical signals in the same manner as the optical transceiver 20 disposed on the aircraft. The optical transceiver contained within the junction both 36 is coupled to the ground-based computer system (not shown) by a second cable 38, which may be either fiber optic cable or a conventional wire cable. The magnetic attachment head 40 secures the fiber optic cable 30 to the exterior of the aircraft so that the optical signals produced by the optical transceiver 20 are transmitted via the fiber optic cable 30 and the cable 38 to the ground-based computer system.

The junction box 36 is preferably disposed in a storage compartment located below ground level to store the fiber optic cable 30 and magnetic attachment head 40 in order to prevent damage to the system when it is not being used. The magnetic attachment head 40 includes a handle 42 of sufficient length such that a member of a ground crew can position the magnetic attachment head 40 over the optical transceiver 20. Disposed in the handle 42 is a steel cable 48 (not shown) that is actuated by a trigger (also not shown) to secure and release the magnetic attachment head from the aircraft in a manner that will be further described below. It should be noted that the present invention can be used in conjunction with the communications system described in the '328 application. The present invention requires only that the optical transceiver disclosed in the '328 application contain a plurality of magnetic target elements (also discussed in further detail below) to be positioned around the optical transceiver in order to allow communication between the aircraft computer system and the ground-based computer system to take place at locations other than where the aircraft is docked at a passenger loading bridge that is equipped with an optical transceiver.

Figure 2:
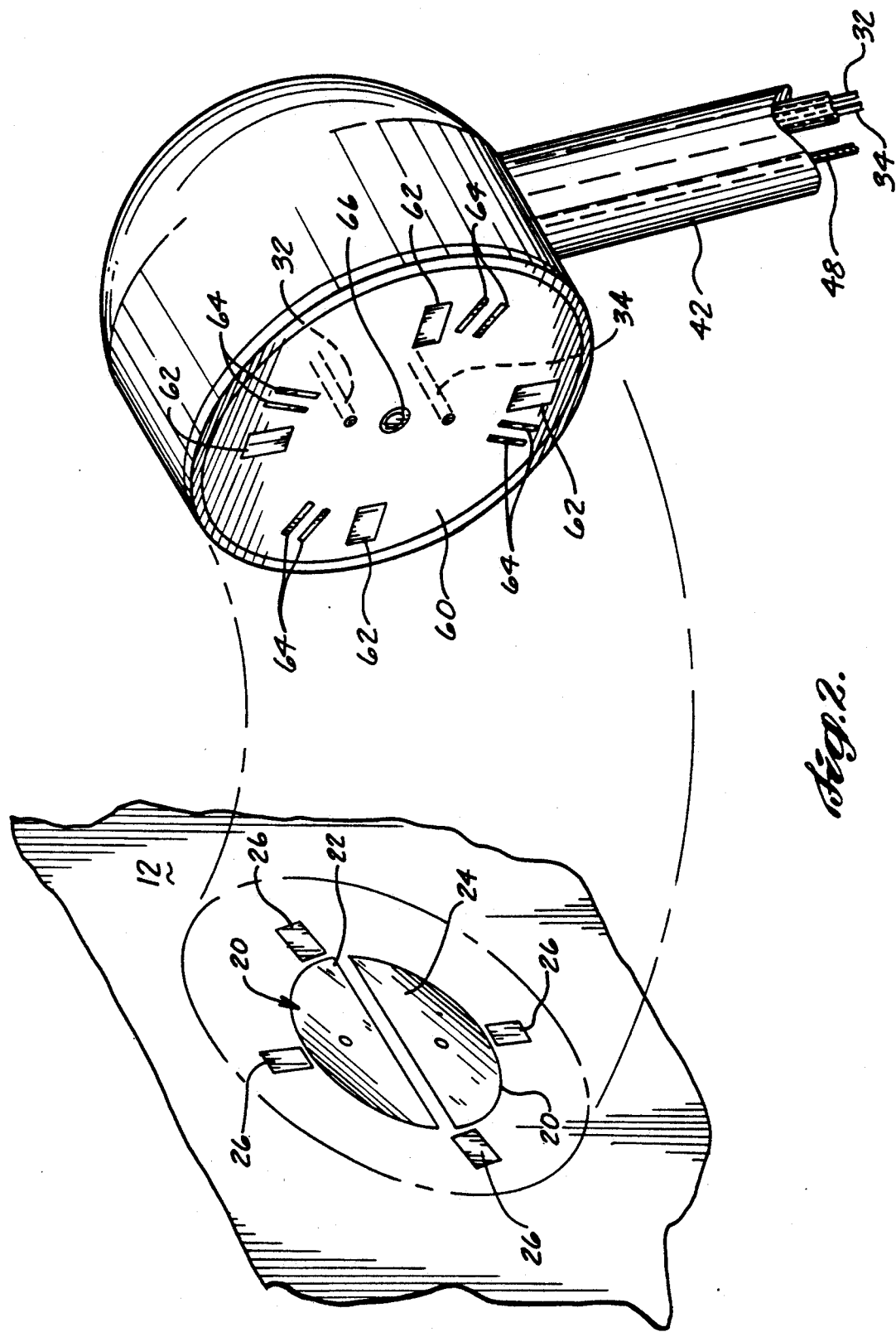
FIG. 2 is a view of an exterior surface of an aircraft optical transceiver and a magnetic attachment head that secures a fiber optic cable to the exterior of the aircraft.

FIG. 2 shows a more detailed view of an optical transceiver 20, which is disposed on an exterior surface 12 of the aircraft 10 and the magnetic attachment head 40. The optical transceiver 20 includes two windows 22 and 24. An optical transmitter (not shown) is disposed behind the window 22 while an optical receiver (also not shown) is disposed behind window 24. Surrounding the optical transceiver 20 at suitably spaced intervals are a plurality of magnetic target elements 26. The magnetic target elements 26 are made of a ferromagnetic material such as a soft steel that is attracted by a magnet. The magnetic attachment head 40 includes a plurality of magnets (shown in FIG. 3) that, when aligned with the magnetic target elements 26, secure the magnetic attachment head to the exterior of the aircraft. Preferably, the magnets are of high energy type, such as samarium cobalt. The high energy magnets will align the magnetic attachment head 40 with the plurality of magnetic target elements 26. In this way, it is possible to place the magnetic target elements at irregular intervals so as to form a "magnetic key" that prevents misalignment of the magnetic attachment head over the optical transceiver 20.

When the magnetic attachment head 40 is secured to the exterior surface of the aircraft 10, one end of a first fiber optic cable 32 is aligned with the optical transmitter disposed behind the window 22 and one end of a second optical fiber 34 is aligned with the optical receiver disposed behind the window 24. With the magnetic attachment head 40 in place, the optical signals produced and received by the optical transceiver 20 are not transmitted through free space, as described in the '328 application, but are carried by the fiber optic cables 32 and 34 between the aircraft computer system and a transceiver coupled to the ground-based computer system.

Figure 3:
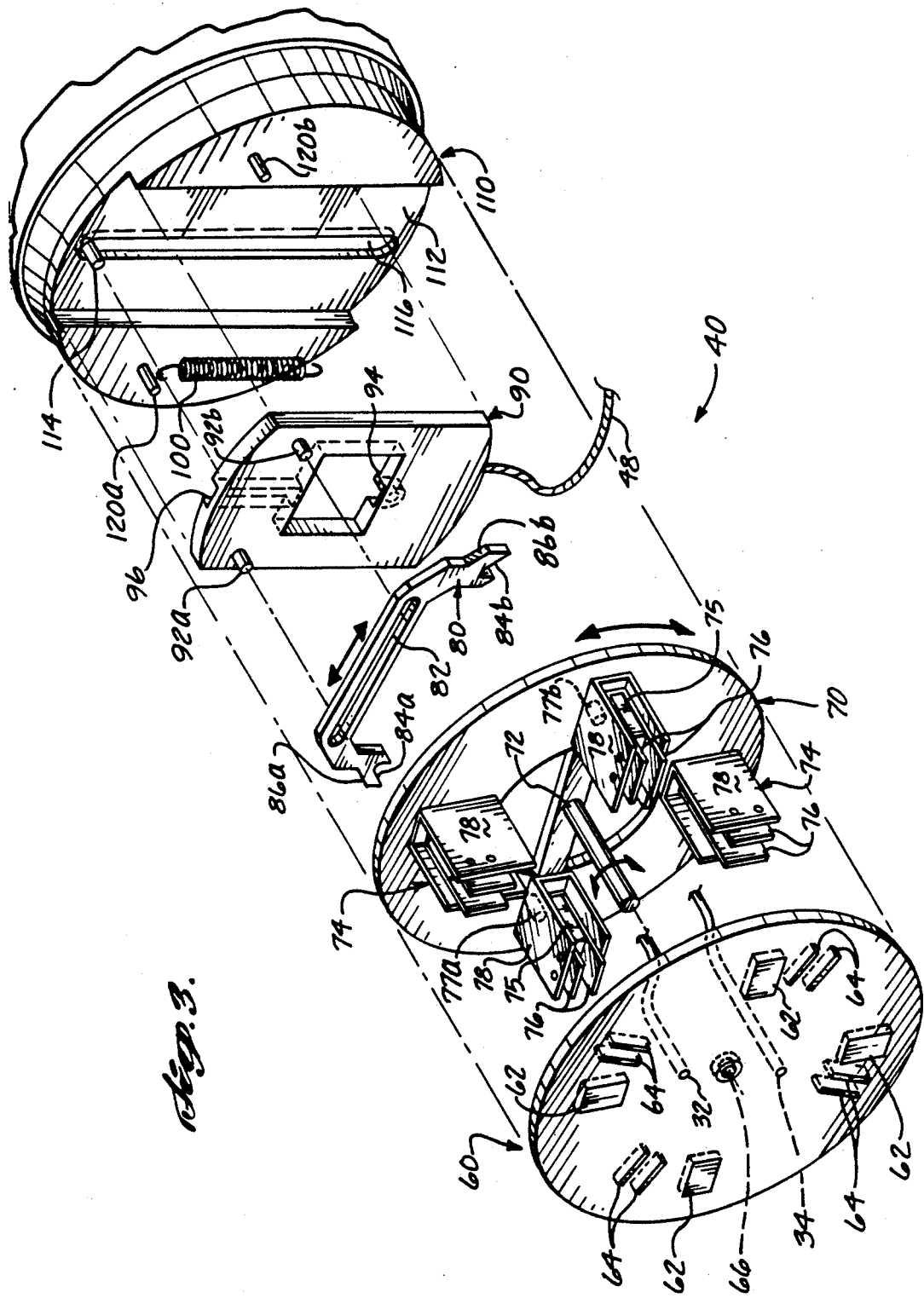
FIG. 3 is an exploded view of the magnetic attachment head according to the present invention.

An exploded view of the magnetic attachment head 40 is shown in FIG. 3. The magnetic head 40 includes a faceplate 60, a rotor plate 70, a claw 80, a sliding plate 90, a spring 100, and a backplate 110. The fiber optic cables 32 and 34 preferably terminate flush with the faceplate 60. In this way, the magnetic attachment head is said to be passive, i.e., it contains no active electronics to produce optical signals and convert received optical signals back into electronic signals. This has the benefit of making the communications system more reliable since the somewhat delicate optical transceiver is located at a remote location and will not be damaged if the magnetic attachment head is dropped. However, those skilled in the art will realize it is possible to mount a corresponding optical transceiver in the magnetic attachment head if optical power requirements made it necessary in order to achieve proper data transfer. Also disposed in the faceplate 60 are a plurality of magnetic keepers 62 and a plurality of pole piece extenders 64. As will be described below, the magnetic keepers 62 and pole piece extenders 64 operate to turn "on" or turn "off" a magnetic field generated by the plurality of magnets such that the magnetic head engages and disengages the exterior surface 12 of the aircraft.

The rotor plate 70 includes a centrally disposed axle 72 about which the rotor plate 70 rotates with respect to the fixed faceplate 60. One end of the axle 72 fits into a recess 66 at the center of the faceplate 60 to maintain the separation of the faceplate and the rotor plate. Disposed about the circumference of the rotor plate are a plurality of magnet assemblies 74. Each magnet assembly 74 includes a permanent magnet 75, a pair of pole pieces 76, and a pair of supporting arms 78. The pole pieces 76 act in conjunction with the magnetic keepers 62 and the pole piece extenders 64 disposed in the faceplate 60 to contain the magnetic fields produced by the magnets 75 within the magnetic attachment head or to extend the magnetic fields outwardly from the front of the faceplate 60 in order to secure the magnetic attachment head to the magnetic target elements 26 shown in FIG. 2.

The operation of the magnet assemblies 74 and the magnetic keepers 62 and pole piece extenders 64 is shown in FIGS. 6A and 6B. FIG. 6A shows a cross section of a magnet assembly 74 that is aligned with a magnetic keeper 62. As described above, the magnet assembly includes the magnet 75, a pair of pole pieces 76 disposed on either side of the magnet, and a pair of support arms 78 disposed on the outside of the pole pieces. Both the pole pieces 78 and the pole piece extenders 64 described below, are made of a highly permeable material to direct the magnetic field produced by the magnet 75. When the magnetic assembly is positioned in front of a magnetic keeper 62 that is disposed in the faceplate 60, the magnetic field produced by the magnet 75 forms a closed loop that extends through the pole pieces 76 and the magnetic keeper 62 to return to the magnet 75, as is indicated by the heavy line. As can be seen, the magnetic field does not extend outside of the front faceplate 60 but is contained within the magnetic attachment head. In this position, the magnetic field is said to be turned "off."

FIG. 6B shows how the magnetic field produced by a magnet is extended outside of the faceplate 60 when a magnet assembly is aligned with a pair of pole piece extenders. When the magnet assembly 74 is aligned with the pair of pole piece extenders 64 and the magnetic attachment head is adjacent the magnetic target elements 26, the magnetic field produced by the magnet 75 completes a closed circular path that passes through the pole pieces 76, through the pole piece extenders 64 to reach the magnetic target element 26, which is disposed in the exterior surface 12 of the aircraft. Thus, when the magnet assembly 74 is aligned with the pole piece extenders 64, the magnetic field of the attachment head is said to be turned "on" to secure the magnetic attachment head 40 to the exterior surface of the aircraft.

Returning now to FIG. 3, the operation of the mechanism that moves the rotor plate 70 to align the magnet assemblies 74 with either the pole piece extenders 64 or the magnetic keepers 62 will be described. The claw 80, disposed behind the rotor plate 70, includes a slot 82 that receives two fixed pins 92a and 92b that are disposed on the sliding plate 90. The slot 82 in combination with the fixed pins 92a and 92b allow the claw 80 to be moved horizontally. The sliding plate 90 fits within a corresponding slot 112 on the backplate 110. The spring 100 is secured between a fixed pin 114 located on the backplate 110 and a fixed pin 94 located on the sliding plate 90. The spring 100 lies in a groove 116 on the backplate 110 and a groove 96 on the sliding plate 90. In operation, a user "turns on" and "turns off" the magnetic fields by successively pulling the steel cable 48. As the cable is pulled, the sliding plate 90 moves the claw 80, which in turn rotates the rotor plate 70 so that the magnet assemblies are aligned with either the magnetic keepers 62 or the pole piece extenders 64.

Figure 4:
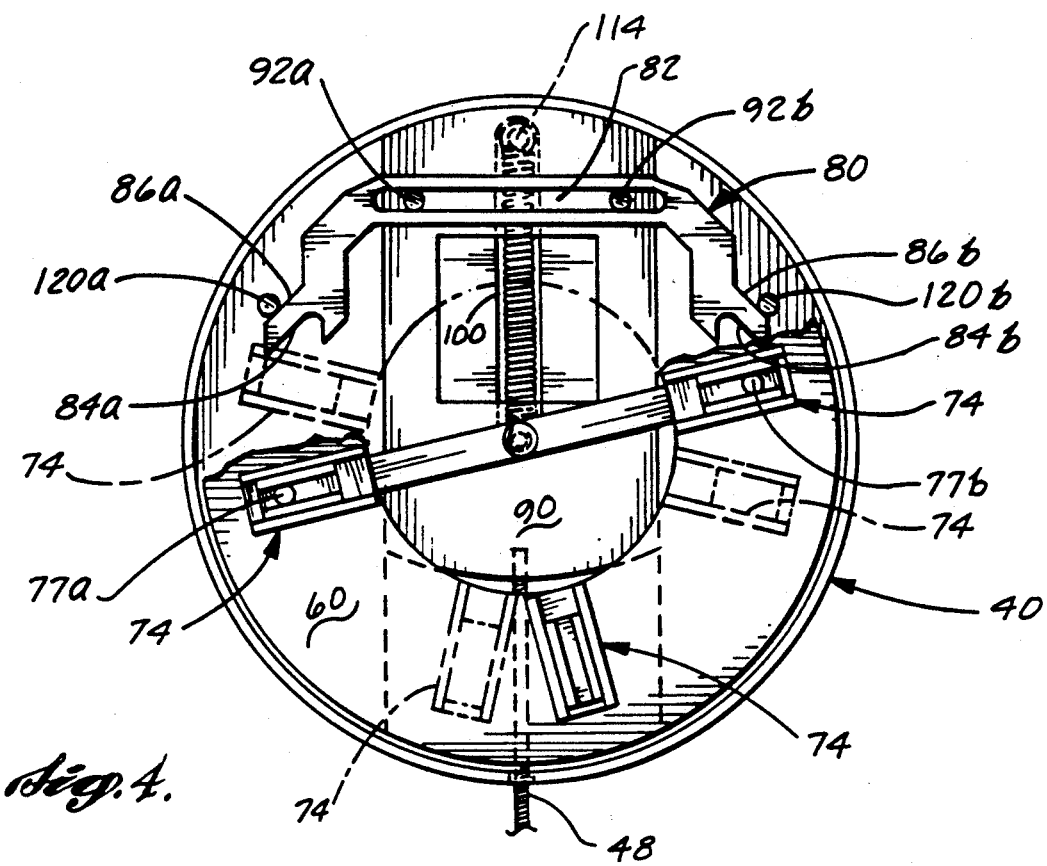
FIGS. 4 and 5 show how a mechanism within the magnetic attachment head rotates a plurality of magnets to secure or release the magnetic attachment head from the exterior of the aircraft.
Figure 5:
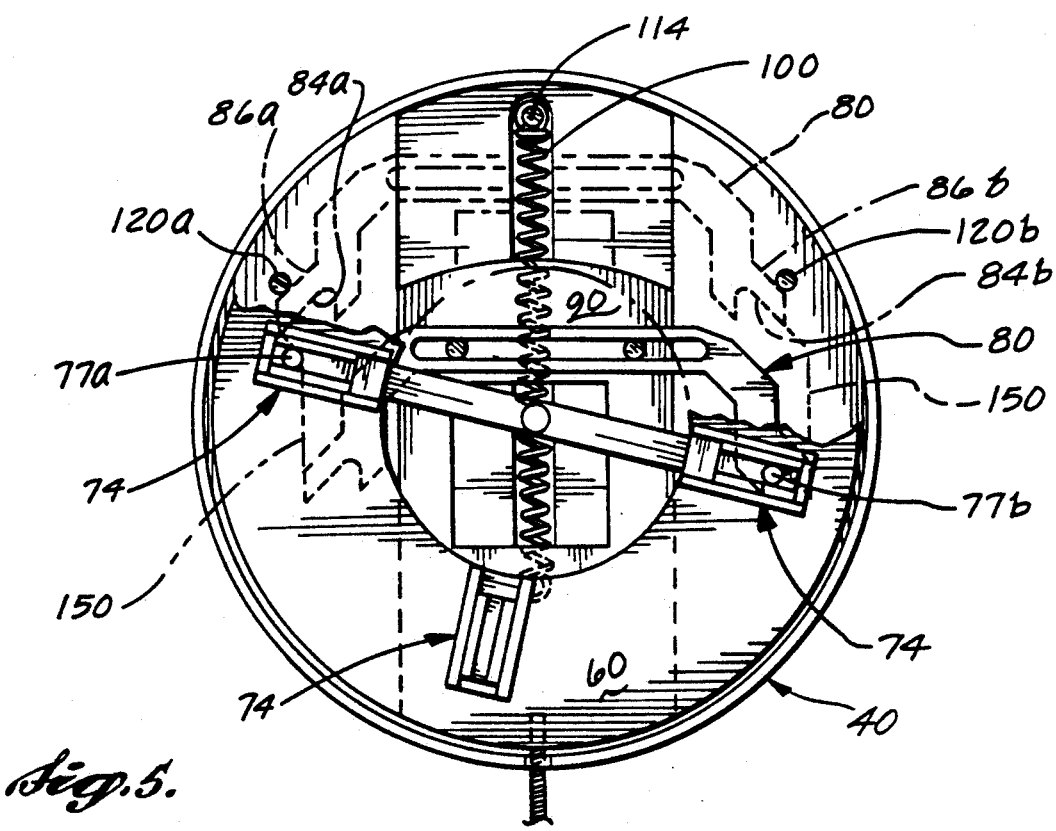
Figure 8:
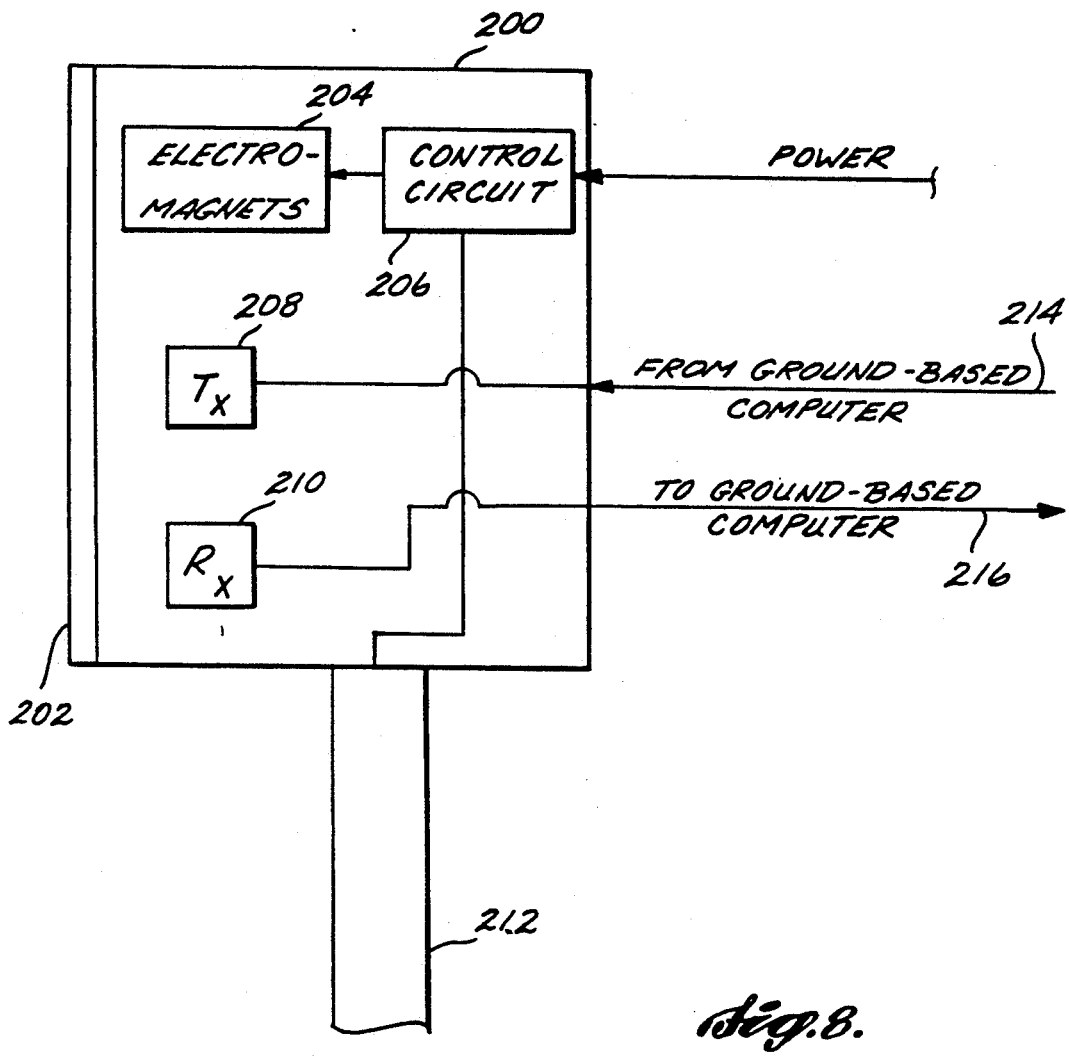
FIG. 8 shows a block diagram of an alternate embodiment of the magnetic attachment head according to another aspect of the present invention.

FIGS. 4 and 5 show in detail how the claw 80 moves to rotate the rotor plate 70. FIG. 4 shows the position of the claw 80 when the spring 100 is relaxed. A pair of surfaces 86a and 86b on the claw 80 engage a pair of fixed pins 120a and 120b disposed on the back plate 110 to center the claw laterally. Upon pulling the cable 48, the sliding plate 90 is moved downward until a surface 84b on the claw 80 engages a pin 77b that is disposed on the backside of the rotor plate 70. As the claw is pulled further downward by the cable 48, the pin 77b, in conjunction with the surface 84b, causes the claw to move horizontally along a path 150 as is shown in FIG. 5. By moving the claw horizontally, the left-hand surface 86a of the claw does not engage the pin 77a. As the claw is pulled further downward, the pin 77b and rotor plate 70 are rotated clockwise approximately 15 degrees. By rotating the rotor plate 70 clockwise, the magnet assemblies are aligned with the pole piece extenders 64 to turn on the magnetic field "on" as described above. As the cable 48 is released, the rotor plate remains at its new position shown in FIG. 5, while the claw 80 returns along the path 150.

As the claw returns along the path 150, the surfaces 86a and 86b engage the fixed pins 120a and 120b so that the claw 80 returns to its center position. When the cable 48 is pulled again, the surface 84a on the left side of the claw engages the pin 77a to move the claw horizontally to the left. As the claw is pulled further downward, the surface 84b of the claw misses the pin 77b so that the claw moves the rotor plate 70 counterclockwise back to the position shown in FIG. 4. In this position, the magnet assemblies are aligned with the magnetic keepers 62 so the magnetic field is turned "off," thereby releasing the magnetic attachment head 40 from the aircraft.

An alternate embodiment of the present invention is shown in FIG. 7. In this embodiment the fiber optic cable is equipped with two magnetic attachment heads. The first magnetic attachment head 40 secures the fiber optic cable 30 to the exterior of the aircraft. A second magnetic attachment head 190 is used to secure the fiber optic cable over an optical transceiver 180 located on a passenger loading bridge 170. The optical transceiver 180 is coupled to the ground-based computer system by a cable 182. The magnetic attachment head 190 is constructed in the same manner as the magnetic attachment head 40.

Such a system with two magnetic attachment heads may be used when free-space optical transmission of infrared signal is not possible. For example in conditions of high ambient light or heavy snow, it may be necessary to transmit such optical signal through a fiber optic cable instead of through the air.

Another embodiment of the magnetic attachment head is shown in FIG. 9. As is shown in this block diagram, a magnetic attachment head 200 includes a set of electromagnets 204, a control circuit 206, an optical transmitter 208 and an optical receiver 210. All the elements within the magnetic attachment head 200 are powered by an external power source. The control circuit is controlled by a trigger (not shown) in a handle 212. The control circuit energizes and de-energizes the set of electromagnets. When the electromagnets are energized, a magnetic field is produced that extends outwardly from a front face 202 of the magnetic attachment head in order to secure the magnetic attachment head to the aircraft. When the electromagnets are de-energized by the control circuit, no magnetic fields are produced and the magnetic attachment head will uncouple from the side of the aircraft.

The magnetic attachment head 200 also has the optical transmitter 208 and optical receiver built in. The optical transmitter and receiver are the same as those disclosed in the '328 application referenced above. The transmitter 208 is coupled to the ground-based computer by a cable 214, while the receiver 210 is coupled to the ground-based computer system by a cable 216.

While the preferred embodiment of the invention has been illustrated and described, it will be appreciated that various changes can be made therein without departing from the spirit and scope of the invention. For example, although the rotor plate 70 is shown only having four magnet assemblies, those skilled in the art will realize that more magnet assemblies could be placed around the circumference of the rotor plate to further increase the magnetic force to secure the magnetic head assembly 40 to the aircraft. Similarly, it is not necessary that the magnet assemblies rotate with respect to fixed magnetic keepers and pole piece extenders. Rather, with a minor mechanical modification, the magnetic keepers could be made to rotate with respect to a fixed set of magnet assemblies. Furthermore, other means could be used in place of the magnetic head assembly to secure the fiber optic cable over the optical transceivers. For example, an attachment head could be built that had a rubber seal disposed about its faceplate and was equipped with an air pump for removing the air between the faceplate and the optical transceiver in order to secure the fiber optic cable to the optical transceiver using a suction face. Alternatively, the attachment head may include a mechanical means such as a rubber ring that could be pressed into a corresponding slot around the transceiver to secure the attachment head to the optical transceiver. Also, the attachment head and optical transceiver could be equipped with an adhesive material such as a hook and loop material to secure the attachment head to the transceiver. Therefore, it is intended that the above description be used solely for purposes of illustration and not in a limiting sense.

The embodiments of the invention in which an exclusive property or privilege is claimed are defined as follows:

1. A system for carrying optical signals between an optical transceiver disposed on an aircraft for receiving and transmitting free-space optical signals, and a ground-based computer system, the system comprising:
    a fiber optic cable that can be coupled to the ground-based computer system for carrying the optical signals produced by the optical transceiver disposed on the aircraft; and
    means for coupling the fiber optic cable to the aircraft and for aligning the fiber optic cable with the optical transceiver so that the fiber optic cable carries the optical signals produced by the optical transceiver from the optical transceiver to the ground-based computer system.

2. The system of claim 1, wherein the means for coupling the fiber optic cable to the aircraft comprises:
    an attachment head that includes one or more magnets positioned to secure the attachment head to the aircraft and align the fiber optic cable with the optical transceiver.

3. The system of claim 2, wherein the means for coupling the fiber optic cable to the aircraft further comprises:
    one or more magnetic target elements disposed on the aircraft in a pattern corresponding to the position of the magnets in the attachment head, the magnetic target elements acting together with the one or more magnets to secure the attachment head onto the aircraft and align the fiber optic cable with the optical transceiver.

4. The system of claim 2, wherein the attachment head further comprises:
    means for containing one or more magnetic fields produced by the one or more magnets so as to release the attachment head from the aircraft.

5. The system of claim 4, wherein the means for containing the one or more magnetic fields produced by the one or more magnets comprises:
    one or more magnetic keepers that are positioned to intercept the one or more magnetic fields produced by the one or more magnets, such that the magnetic keepers form one or more closed magnetic circuits so as to release the attachment head from the aircraft.

6. The system of claim 5, further comprising means for moving the one or more magnets away from the one or more magnetic keepers, such that the magnetic fields produced by the magnets extend outwardly from the attachment head so as to engage the magnetic target elements when the attachment head is attached to the aircraft.

7. The system of claim 6, wherein the means for moving the one or more magnets away from the one or more magnetic keepers comprises:
   a rotary plate on which one or more of the magnets are mounted, the rotary plate including an axis about which said one or more magnets rotate; and
   means for rotating the rotary plate, such that said one or more magnets rotate away from the magnetic keepers.

8. The system of claim 7, further comprising a plurality of pole piece extenders disposed on a plate upon which the magnetic keepers are disposed and wherein the means for rotating the rotary plate operates to align said one or more magnets with the pole piece extenders.

9. A system for use with an aircraft communications system that includes an optical transceiver disposed on an aircraft, and coupled to an aircraft computer system, for transmitting and receiving free-space optical signals from a ground-based computer system, wherein the optical signals correspond to data transmitted between the aircraft computer system and the ground-based computer system, the system comprising:
   a fiber optic cable having a first end couplable to the ground-based computer system, a second end couplable to the aircraft; and
   a magnetic attachment head disposed at the second end of the fiber optic cable adapted to couple the fiber optic cable to the aircraft and to magnetically align the fiber optic cable on the aircraft such that optical signals produced by the optical transceiver disposed on the aircraft are transmitted to and received from the ground-based computer system through the fiber optic cable instead of through free space.

10. The system of claim 9, further comprising:
   a second magnetic attachment head disposed at the first end of the fiber optic cable and adapted to couple the fiber optic cable to the ground-based computer system.

11. The system of claim 9, wherein the magnetic attachment head further comprises:
   at least one electromagnet; and
   means for energizing the electromagnet to produce a magnetic field that couples the magnetic attachment head to the aircraft when the magnetic attachment head is in an attached and aligned position.

12. The system of claim 9, wherein the magnetic attachment head further comprises:
   a plurality of magnets; and
   one or more magnetic target elements disposed on the aircraft, the magnetic target elements acting together with the plurality of magnets to hold the magnetic attachment head onto the aircraft when the magnetic attachment head is in an attached and aligned position.

13. The system of claim 12, wherein the magnetic attachment head further comprises:
   a rotatable plate upon which the plurality of magnets are disposed; and
   a plurality of magnetic keepers coupled to a second plate and positioned to intercept the magnetic fields produced by the plurality of magnets when the attachment head is in an off position, such that the magnetic keepers and magnets form a plurality of closed magnetic circuits, thereby releasing the magnetic attachment head from the aircraft.

14. The system of claim 13, further comprising means for moving the plurality of magnets away from the plurality of magnetic keepers such that the magnetic fields produced by the plurality of magnets extend outwardly from the magnetic attachment head.

15. The system of claim 14, wherein the means for moving the plurality of magnets away from the plurality of magnetic keepers comprises:
   a pair of pins disposed on the rotatable plate;
   a cable; and
   a claw coupled to the cable and movable therewith such that as the cable is pulled, the claw engages one of the pairs of pins and rotates the rotor plate about an axis and moves the plurality of magnets out of alignment with the plurality of magnetic keepers.

16. In a system for use with an aircraft communications system that transmits data between an aircraft computer system and a ground-based computer system wherein the aircraft communications system includes a first optical transceiver disposed on an aircraft for producing and receiving free-space optical signals that correspond to the data transmitted between the aircraft and ground-based computer system, the improvement comprising:
   a fiber optic cable that can be coupled between the ground-based computer system and the optical transceiver, for carrying the optical signals between the ground-based computer system and the optical transceiver; and
   an attachment head that releasably secures the fiber optic cable directly to the aircraft and aligns the fiber optic cable with the optical transceiver.

17. A method of transmitting data between an aircraft computer system and a ground-based computer system, comprising the steps of:
   coupling an optical transceiver to the aircraft computer system;
   producing a series of optical signals that correspond to data to be transmitted between the aircraft computer system and the ground-based computer system at the optical transceiver;
   coupling a fiber optic cable to the ground-based computer system;
   coupling the fiber optic cable to the optical transceiver disposed on the aircraft with a releasable magnetic attachment head;
   aligning the magnetic attachment head until the fiber optic cable is aligned with the optical transceiver; and
   transmitting the optical signals from the optical transceiver disposed on the aircraft directly through the fiber optic cable to the ground-based computer system.

18. A system for use with an aircraft communications system that includes an optical transceiver disposed on an aircraft, and coupled to an aircraft computer system, for transmitting and receiving free-space optical signals from a ground-based computer system, wherein the optical signals correspond to data transmitted between the aircraft computer system and the ground-based computer system, the system comprising:
   a fiber optic cable having a first end couplable to a ground-based computer system;
   a magnetic attachment head disposed at a second end of the fiber optic cable and adapted to couple the fiber optic cable to the aircraft such that optical signals produced by the optical transceiver disposed on the aircraft are transmitted to the ground-based computer system through the fiber optic cable instead of through free-space, the magnetic attachment head comprising:

a plurality of magnets disposed on a first plate;

a plurality of magnetic keepers disposed on a second plate and positioned to intercept the magnetic fields produced by the plurality of magnets when the attachment head is in an off position, such that the magnetic keepers and magnets form a plurality of closed magnetic circuits;

means for moving the plurality of magnets away from the plurality of magnetic keepers such that the magnetic fields produced by the plurality of magnets extend outwardly from the magnetic attachment head when the attachment head is in an on position, wherein the means for moving the plurality of magnets includes:

a pair of pins disposed on at least one of the first and second plates;

a cable; and a claw coupled to the cable and movable therewith such that the claw engages the pair of pins to rotate at least one of the first and second plates and move the plurality of magnets out of alignment with the plurality of magnetic keepers.

19. A system for carrying optical signals between an optical transceiver for receiving and transmitting free-space optical signals disposed on an aircraft and a ground-based computer system, the system comprising:

a fiber optic cable for carrying the optical signals produced by the optical transceiver to the ground-based computer system;

an attachment head for coupling the fiber optic cable to the aircraft and for aligning the fiber optic cable with the optical transceiver, the attachment head including:

a plurality of magnets positioned so as to interact with a plurality of magnetic target elements disposed on the aircraft; and one or more magnetic keepers positioned so as to form a closed magnetic circuit with the plurality of magnets when the attachment head is in an off position, thereby releasing the magnetic attachment head from the aircraft, and to allow the magnetic fields produced by the plurality of magnets to extend outwardly from the magnetic attachment head when the magnetic attachment head is in an on position, thereby allowing the magnetic fields to secure the magnetic attachment head to the aircraft.

* * * * *